(12) United States Patent
Jung et al.

(10) Patent No.: US 9,383,879 B2
(45) Date of Patent: Jul. 5, 2016

(54) TOUCH SENSOR

(71) Applicant: SAMSUNG ELECTRO-MECHANICS CO., LTD., Suwon-Si (KR)

(72) Inventors: Hyun Chul Jung, Suwon-Si (KR); Sang Hoon Park, Suwon-si (KR); Jang Bae Son, Suwon-si (KR); Tae Hoon Kim, Suwon-Si (KR)

(73) Assignee: SAMSUNG ELECTRO-MECHANICS CO., LTD., Gyeonggi-Do (KR)

( * ) Notice: Subject to any disclaimer, the term of this patent is extended or adjusted under 35 U.S.C. 154(b) by 67 days.

(21) Appl. No.: 14/457,101

(22) Filed: Aug. 11, 2014

(65) Prior Publication Data

US 2015/0091590 A1  Apr. 2, 2015

(30) Foreign Application Priority Data

Oct. 1, 2013  (KR) .................. 10-2013-0117443

(51) Int. Cl.
  *G01R 27/26* (2006.01)
  *G06F 3/044* (2006.01)

(52) U.S. Cl.
  CPC ...... *G06F 3/044* (2013.01); *G06F 2203/04112* (2013.01)

(58) Field of Classification Search
  CPC .............. G06F 3/044; G06F 2203/04112
  USPC ......................................... 324/685
  See application file for complete search history.

(56) References Cited

U.S. PATENT DOCUMENTS

| 5,422,566 | A  | * | 6/1995  | Boenning ............ G01R 15/148 324/117 R |
| 5,473,244 | A  | * | 12/1995 | Libove ................. G01R 1/22 324/126 |
| 5,717,326 | A  | * | 2/1998  | Moriwaki ............ G01R 15/18 324/117 H |
| 5,767,668 | A  | * | 6/1998  | Durand ............ G01R 31/2844 324/117 R |
| 6,252,389 | B1 | * | 6/2001  | Baba ................. G01R 15/202 324/117 H |
| 6,373,265 | B1 | * | 4/2002  | Morimoto ........... G01D 5/2417 324/661 |
| 7,719,258 | B2 | * | 5/2010  | Chen .................. G01R 15/202 324/117 H |
| 8,400,138 | B2 | * | 3/2013  | Cooper ............... G01R 15/181 324/117 R |
| 8,722,314 | B2 | * | 5/2014  | Kuriki ................ H05K 3/064 430/320 |
| 2001/0000961 | A1 | * | 5/2001  | Hikida .............. G02F 1/1333 345/173 |

(Continued)

FOREIGN PATENT DOCUMENTS

| CH | EP 2202527 A1 | * | 6/2010 | ........... G01R 15/202 |
| JP | EP 1037056 A1 | * | 9/2000 | ........... G01R 15/14 |

(Continued)

*Primary Examiner* — Patrick Assouad
*Assistant Examiner* — Sean Curtis
(74) *Attorney, Agent, or Firm* — McDermott Will & Emery LLP

(57) ABSTRACT

Disclosed herein is a touch sensor using a metal electrode. More specifically, the present invention relates to a touch sensor capable of implementing reliability of the metal electrode and having economical efficiency even under a condition of high temperature and humidity by forming a first protection layer including a heterocycle compound on metal fine lines forming the electrode pattern.

9 Claims, 3 Drawing Sheets

(56) References Cited

U.S. PATENT DOCUMENTS

| | | | | |
|---|---|---|---|---|
| 2008/0077336 | A1* | 3/2008 | Fernandes | G01R 15/142 702/57 |
| 2011/0020640 | A1* | 1/2011 | Sherman | C09J 7/0207 428/343 |
| 2011/0198712 | A1* | 8/2011 | Okumura | G01L 1/205 257/415 |
| 2011/0245495 | A1* | 10/2011 | Inoue | C07F 15/0033 544/225 |
| 2011/0248711 | A1* | 10/2011 | Ausserlechner | G01R 15/207 324/251 |
| 2011/0289771 | A1* | 12/2011 | Kuriki | H05K 3/064 28/829 |
| 2012/0094037 | A1* | 4/2012 | Banba | C09J 7/00 428/1.5 |
| 2012/0104373 | A1* | 5/2012 | Inoue | C07F 15/0033 257/40 |
| 2012/0187937 | A1* | 7/2012 | Blake | G01R 33/032 324/96 |
| 2012/0237873 | A1* | 9/2012 | Fujiwara | C08G 77/14 430/280.1 |
| 2013/0033260 | A1* | 2/2013 | Nomura | G01R 15/207 324/252 |
| 2013/0106400 | A1* | 5/2013 | Cheng | G01R 15/20 324/117 R |
| 2013/0199915 | A1* | 8/2013 | Guard | G06F 3/044 200/600 |
| 2013/0323437 | A1* | 12/2013 | Banba | C09J 7/00 428/1.54 |
| 2014/0210835 | A1* | 7/2014 | Hong | H01L 29/78696 345/530 |
| 2014/0347036 | A1* | 11/2014 | Noh | G01R 15/183 324/126 |
| 2014/0360855 | A1* | 12/2014 | Kim | G06F 3/044 200/600 |
| 2014/0362000 | A1* | 12/2014 | Seo | G02F 1/13394 345/173 |
| 2015/0016006 | A1* | 1/2015 | van Vroonhoven | H01F 13/006 361/149 |
| 2015/0029412 | A1* | 1/2015 | Kishioka | G06F 3/044 349/12 |
| 2015/0042320 | A1* | 2/2015 | Cadugan | G01R 33/06 324/207.2 |
| 2015/0091590 | A1* | 4/2015 | Jung | G06F 3/044 324/685 |
| 2015/0152294 | A1* | 6/2015 | Sherman | C09J 7/00 428/200 |
| 2015/0212619 | A1* | 7/2015 | Yoo | G06F 3/041 345/174 |
| 2015/0316623 | A1* | 11/2015 | Romero | G01R 33/077 324/251 |
| 2015/0331072 | A1* | 11/2015 | Ogawa | G01R 33/1253 324/252 |
| 2015/0338473 | A1* | 11/2015 | Diaconu | G01R 33/0029 324/251 |
| 2015/0340622 | A1* | 11/2015 | Inoue | H01L 51/0067 257/40 |

FOREIGN PATENT DOCUMENTS

| | | | | |
|---|---|---|---|---|
| JP | WO 2012176789 A1 | * | 12/2012 | G06F 3/044 |
| KR | 10-1246351 | | 3/2013 | |
| PL | WO 2011154157 A1 | * | 12/2011 | G01R 15/183 |

* cited by examiner

TOUCH SENSOR

CROSS REFERENCE TO RELATED APPLICATION

This application claims the benefit of Korean Patent Application No. 10-2013-0117443, filed on Oct. 1, 2013, entitled "Touch Sensor", which is hereby incorporated by reference in its entirety into this application.

BACKGROUND OF THE INVENTION

1. Technical Field

The present invention relates to a touch sensor.

2. Description of the Related Art

In accordance with popularization of a smart phone, a usage of a touch sensor is rapidly increased, and even in fields such as a monitor, a television (TV), and the like in which the touch sensor was not previously used, the touch sensor has been quickly introduced. Currently, an indium tin oxide (ITO) which is widely used as a transparent electrode for the touch sensor has a limitation in that it is difficult to implement a large touch sensor due to high cost, a limited supply, and high resistance. Therefore, new touch sensors having various forms have been suggested. Among others, a metal mesh is suitable for the touch sensor having a large area due to an advantage of low resistance, but has degraded visibility due to opaqueness of a pattern, and may be readily oxidized because it is sensitive to water. In order to prevent oxidization of a metal pattern, a method of coating, printing, or laminating a liquid material or film having transparency and low water vapor transmission on an entire surface of the pattern has been widely used. Moisture-resisting films used in a flat panel display such as a liquid crystal display (LCD), an organic light emitting diode (OLED), or the like are so called hermetic sealing materials having low water vapor transmission rate of about $10^{-1}$ to $10^4$ g/m²·day and have excellent barrier characteristics against water and oxygen. However, since these moisture-resisting films are expensive, it is difficult to use the moisture-resisting films in a relatively inexpensive touch sensor or a touch sensor having a large area.

Meanwhile, in a capacitive touch screen panel disclosed in Patent Document 1, there is a limitation in supplementing a problem that a transparent electrode pattern is vulnerable to water and foreign materials introduced from the outside and corrosion, and there is a problem in that resistance to the environment and resistant to water vapor transmission characteristics are weak under a condition of high temperature and humidity because water permeates into the transparent electrode pattern.

(Patent Document 1) Korean Patent No. 1246351

SUMMARY OF THE INVENTION

The present invention has been made in an effort to provide a touch sensor capable of implementing reliability of a metal electrode even under a condition of high temperature and humidity by including a heterocycle compound having good economical efficiency in a first protection layer.

Therefore, the present invention has been made in an effort to provide a touch sensor capable of implementing reliability of a metal electrode even under a condition of high temperature and humidity by forming a first protection layer on the metal electrode.

According to a preferred embodiment of the present invention, there is provided a touch sensor, including: a base substrate; an electrode pattern formed on one surface of the base substrate and formed by intersecting metal fine lines with each other; and a first protection layer formed on the electrode pattern, wherein the first protection layer includes a heterocycle compound.

The heterocycle compound may be at least one selected from a group consisting of imidazole, azole, thiol, and amine based.

The heterocycle compound may be a benzimidazole derivative represented by the following Chemical Formula 1 or a benzotriazole derivative represented by the following Chemical Formula 2,

[Chemical Formula 1]

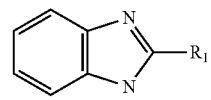

where $R_1$ is an alkyl group ($C_nH_{2n+1}$) (n is integer of 1 to 5) or an aryl group (Ar—), and

[Chemical Formula 2]

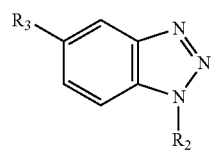

$R_2$ is hydrogen (H) or an ester group ($COOCH_3$) and $R_3$ is a methyl group ($CH_3$) or carboxyl group (COOH).

The electrode pattern may include a first electrode pattern formed on one surface of the base substrate and a second electrode pattern formed on the other surface of the base substrate.

The electrode pattern having the first protection layer formed thereon may have a second protection layer formed on an entire surface thereof.

The first protection layer may be at least one selected from a group consisting of imidazole, azole, thiol, and amine based.

The heterocycle compound may be a benzimidazole derivative represented by the following Chemical Formula 1 or a benzotriazole derivative represented by the following Chemical Formula 2,

[Chemical Formula 1]

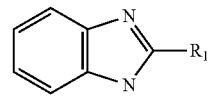

where $R_1$ is an alkyl group ($C_nH_{2n+1}$) (n is integer of 1 to 5) or an aryl group (Ar—), and

[Chemical Formula 2]

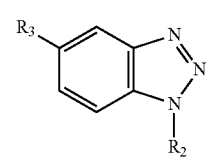

$R_2$ is hydrogen (H) or an ester group ($COOCH_3$) and $R_3$ is a methyl group ($CH_3$) or carboxyl group (COOH).

The second protection layer may be at least one selected from a group consisting of acryl, epoxy, urethane, poly methyl methacrylate, polycarbonate, and poly vinyl acetate.

The touch sensor may further include an adhesive layer formed on the electrode pattern having the first protection layer formed thereon, wherein a third protection layer may be formed on side surfaces including the base substrate and the adhesive layer.

The first protection layer may be at least one selected from a group consisting of imidazole, azole, thiol, and amine based.

The heterocycle compound may be a benzimidazole derivative represented by the following Chemical Formula 1 or a benzotriazole derivative represented by the following Chemical Formula 2,

[Chemical Formula 1]

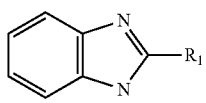

where $R_1$ is an alkyl group ($C_nH_{2n+1}$) (n is integer of 1 to 5) or an aryl group (Ar—), and

[Chemical Formula 2]

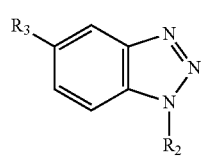

$R_2$ is hydrogen (H) or an ester group ($COOCH_3$) and $R_3$ is a methyl group ($CH_3$) or carboxyl group (COOH).

The third protection layer may be at least one selected from a group consisting of liquefied acryl, epoxy, and urethane based.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
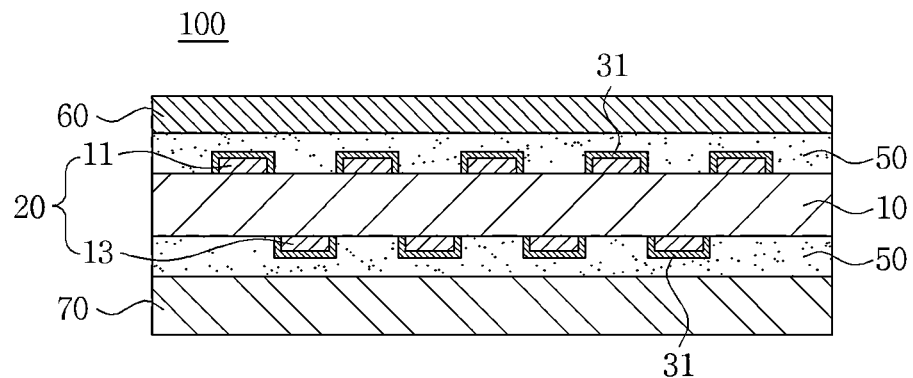
FIG. 1 is a cross-sectional view of a touch sensor having a first protection layer formed thereon according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the accompanying drawings.

FIG. 1 is a cross-sectional view of a touch sensor having a first protection layer formed thereon according to a preferred embodiment of the present invention. Referring to FIG. 1, a touch sensor 100 according to a preferred embodiment of the present invention is configured to include a base substrate 10, an electrode pattern 20 formed on one surface of the base substrate 10 and formed by intersecting metal fine lines 11a and 13a with each other, and a first protection layer 31 formed on the metal fine lines 11a and 13a forming the electrode pattern 20, where the first protection layer 31 may include a heterocycle compound.

The base substrate 10 may be made of polyethylene terephthalate (PET), polycarbonate (PC), poly methyl methacrylate (PMMA), polyethylene naphthalate (PEN), polyethersulfone (PES), cyclic olefin polymer (COC), triacetylcellulose (TAC) film, poly vinyl alcohol (PVA) film, polyimide (PI) film, polystyrene (PS), biaxially stretched polystyrene (K resin containing biaxially oriented PS; BOPS), glass, or tempered glass, but is not particularly limited thereto as long as it is a material having a predetermined strength or more.

The electrode pattern 20 may be formed in a mesh mesh in which the metal fine lines 11a and 13a are intersected with each other, and may be made of copper (Cu), aluminum (Al), gold (Au), silver (Ag), titanium (Ti), palladium (Pd), chromium (Cr), or a combination thereof, but is not particularly limited thereto. In consideration of economical efficiency and conductivity, copper (Cu) may be optimally used. The electrode pattern 20 may be vulnerable to water and cause corrosion in that it uses the metal material. Therefore, the problems such as degradation in reliability due to water, corrosion, and the like of the electrode pattern 20 may be prevented by forming the first protection layer 31 on the electrode pattern 20.

The first protection layer 31 may be made of the heterocycle compound. At least one heterocycle compound may be selected from a group consisting of imidazole, azole, thiol, and amine based, but is not particularly limited thereto. Particularly, a benzimidazole derivative represented by the following Chemical Formula 1 or a benzotriazole derivative represented by the following Chemical Formula 2 may be optimally used.

[Chemical Formula 1]

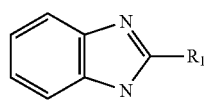

where $R_1$ is an alkyl group ($C_nH_{2n+1}$) (n is integer of 1 to 5) or an aryl group (Ar—),

[Chemical Formula 2]

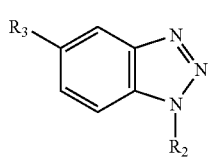

$R_2$ is hydrogen (H) or an ester group ($COOCH_3$) and $R_3$ is a methyl group ($CH_3$) or carboxyl group (COOH).

The benzimidazole derivative represented by the following Chemical Formula 1 or the benzotriazole derivative represented by the following Chemical Formula 2 may form the first protection layer 31 by performing a coordinate bond between nitrogen (N) atoms present in a molecular and metal atoms of the metal fine lines 11a and 13a forming the electrode pattern 20.

The benzotriazole derivative represented by the following Chemical Formula 2, in which one hydrogen atom is further substituted with a nitrogen atom in the benzimidazole derivative represented by the following Chemical Formula 1, has a more stable resonance than the benzimidazole derivative to thereby have high coordinate bonding force, thereby making it possible to form a more stable protection layer. Therefore, the touch sensor 100 according to the preferred embodiment of the present invention may have economical efficiency by forming the first protection layer 31 including the heterocycle compound on the metal fine lines 11a and 13a forming the electrode pattern 20 which is vulnerable to water and corrosion, and may maintain implementation of reliability of the electrode pattern 20 by blocking the introduction of water, foreign materials, and the like even under a condition of high temperature and humidity.

In addition, the touch sensor 100 according to the preferred embodiment of the present invention may form a first electrode pattern 11 on one surface of the base substrate 10 and may form a second electrode pattern 13 on the other surface of the base substrate 10. Also, an adhesive layer 50 may be formed on the first electrode pattern 11 and the second electrode pattern 13 each having the first protection layer 31 formed thereon, a window substrate 60 may be formed on the adhesive layer 50 formed on one surface, a display unit 70 may be formed on the adhesive layer 50 formed on the other surface. The adhesive layer 50 may be an optical clear adhesive (OCA), but is not particularly limited thereto.

The window substrate 60 may be formed to protect the touch sensor 100 from impact from the outside while securing transparency using a tampered glass, and the like, and those skilled in the art may select and use the substrate made of various materials taking into account transparency and rigidity of the substrate. The display unit 70, which visually outputs data on a screen, is a device displaying an image output value according to an input of user input through the touch sensor 100.

In addition, as the display unit 70, a liquid crystal display (LCD), a plasma display panel (PDP), electroluminescence (EL), or a cathode ray tube (CRT) may be used, but the display unit 70 is particularly limited thereto.

Figure 2:
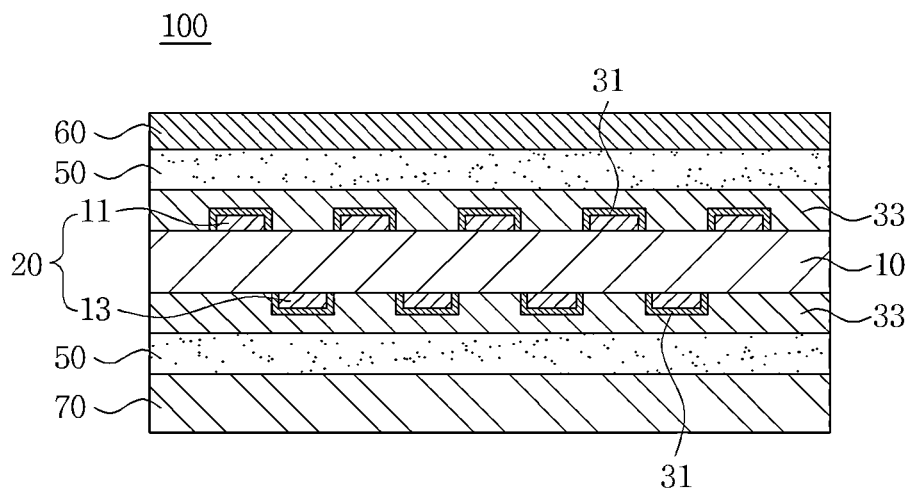
FIG. 2 is a cross-sectional view of a touch sensor having a first protection layer and a second protection layer formed thereon according to another preferred embodiment of the present invention.

FIG. 2 is a cross-sectional view of a touch sensor having a first protection layer and a second protection layer formed thereon according to another preferred embodiment of the present invention. Referring to FIG. 2, a touch sensor 100 according to another preferred embodiment of the present invention is configured to include a base substrate 10, an electrode pattern 20 formed on one surface of the base substrate 10 and formed by intersecting metal fine lines 11a and 13a with each other, and a first protection layer 31 formed on the metal fine lines 11a and 13a forming the electrode pattern 20, where the electrode pattern 20 having the first protection layer 31 formed thereon may have a second protection layer 33 formed on an entire surface thereof. In addition, the first protection layer 31 may include a heterocycle compound.

The touch sensor 100 according to another preferred embodiment of the present invention may form the second protection layer 33 on the entire surface of the electrode pattern 20 having the first protection layer 31 formed thereon in order to further increase effect preventing water introduction into the electrode pattern 20 and corrosion thereof. A material of the second protection layer 33 may be at least one selected from a group consisting of acryl, epoxy, urethane, poly methyl methacrylate, polycarbonate, and poly vinyl acetate, but is not particularly limited thereto.

Therefore, the touch sensor 100 according to another preferred embodiment of the present invention may have economical efficiency by forming the first protection layer 31 and the second protection layer 33 on the electrode pattern 20 which is vulnerable to water and corrosion, and may maintain implementation of reliability of the electrode pattern 20 by blocking the introduction of water, foreign materials, and the like even under a condition of high temperature and humidity.

The touch sensor 100 according to another preferred embodiment of the present invention may form a first electrode pattern 11 on one surface of the base substrate 10 and may form a second electrode pattern 13 on the other surface of the base substrate 10. In addition, the second protection layer 33 may be formed on the entire surface of each of the first electrode pattern 11 and the second electrode pattern 13 each having the first protection layer 31 formed thereon. Also, an adhesive layer 50 may be formed on the second protection layer 33 formed on one surface and the other surface of the base substrate 10, a window substrate 60 may be formed on the adhesive layer 50 formed on one surface, a display unit 70 may be formed on the adhesive layer 50 formed on the other surface.

In the touch sensor 100 according to another preferred embodiment of the present invention, since the technical content and description related to the base substrate 10, the electrode pattern 20, the first protection layer, 31, the adhesive layer 50, the window substrate 60, and the display unit 70 are substantially the same as those described above in the touch sensor according to the preferred embodiment of the present invention, a description overlapped with each other will be omitted.

Figure 3:
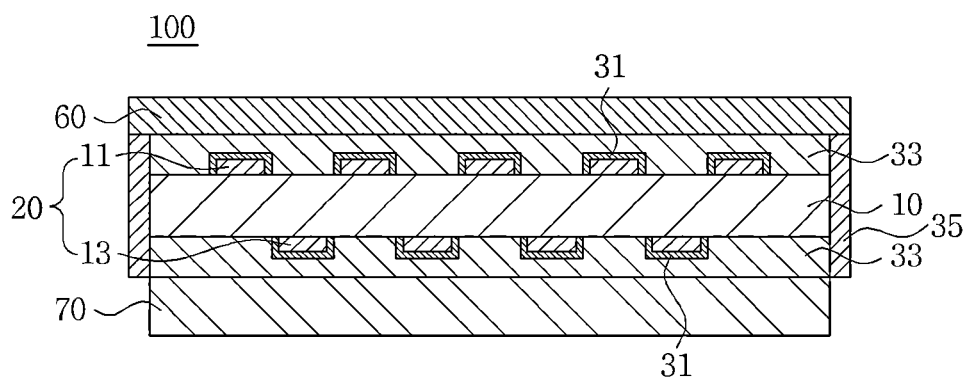
FIG. 3 is a cross-sectional view of a touch sensor having a first protection layer and a third protection layer formed thereon according to still another preferred embodiment of the present invention.

FIG. 3 is a cross-sectional view of a touch sensor having a first protection layer and a third protection layer formed thereon according to still another preferred embodiment of the present invention. Referring to FIG. 3, a touch sensor 100 according to still another preferred embodiment of the present invention is configured to include a base substrate 10, an electrode pattern 20 formed on one surface of the base substrate 10 and formed by intersecting metal fine lines 11a and 13a with each other, and a first protection layer 31 formed on the metal fine lines 11a and 13a forming the electrode pattern 20, where the electrode pattern 20 having the first protection layer 31 formed thereon may have an adhesive layer 50 formed on an entire surface thereof. Here, a third protection layer 35 may be formed on side surfaces including the base substrate 10 and the adhesive layer 50. In addition, the first protection layer 31 may include a heterocycle compound.

The touch sensor 100 according to still another preferred embodiment of the present invention may form the third protection layer 35 on the sides including the base substrate 10 and the adhesive layer 50 in order to further increase an effect preventing water introduction into the electrode pattern 20 and corrosion thereof.

A material of the third protection layer 35 may be at least one selected from a group consisting of liquefied acryl, epoxy, and urethane based, but is not particularly limited thereto. As the adhesive layer 50, an optical clear adhesive (OCA) may be used, and since the adhesive layer 50 has a porous material, it tends to absorb water or foreign materials introduced from the outside. Therefore, an effect capable of preventing water introduction and corrosion of the electrode pattern 20 and blocking the foreign materials introduced from the outside may be further improved by forming the third protection layer 35 on the side surfaces including the base substrate 10 and the adhesive layer 50.

Therefore, the touch sensor 100 according to still another preferred embodiment of the present invention may have economical efficiency by forming the first protection layer 31 on the electrode pattern 20 which is vulnerable to water and corrosion and by forming the third protection layer 35 on the side surfaces including the base substrate 10 and the adhesive layer 50, and may maintain implementation of reliability of the electrode pattern 20 by blocking the introduction of water, the foreign materials, and the like even under a condition of high temperature and humidity.

The touch sensor 100 according to still another preferred embodiment of the present invention may form a first electrode pattern 11 on one surface of the base substrate 10 and may form a second electrode pattern 13 on the other surface of the base substrate 10. In addition, the adhesive layer 50 may be formed on the entire surface of each of the first electrode pattern 11 and the second electrode pattern 13 each having the first protection layer 31 formed thereon, and the third protection layer 35 may be formed on the side surfaces including the base substrate 10 and the adhesive layer 50. In addition, a window substrate 60 may be formed on the adhesive layer 50 formed on one surface and a display unit 70 may be formed on the adhesive layer 50 formed on the other surface.

In the touch sensor 100 according to still another preferred embodiment of the present invention, since the technical content and description related to the base substrate 10, the electrode pattern 20, the first protection layer, 31, the adhesive layer 50, the window substrate 60, and the display unit 70 are substantially the same as those described above in the touch sensor according to the preferred embodiment of the present invention, a description overlapped with each other will be omitted.

Figure 4:
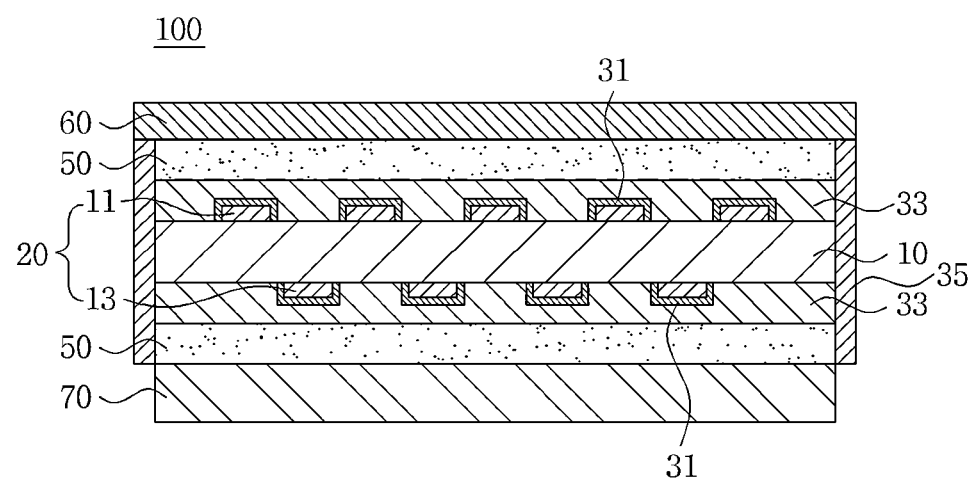
FIG. 4 is a cross-sectional view of a touch sensor having a first protection layer, a second protection layer, and a third protection layer formed thereon according to still another preferred embodiment of the present invention.

FIG. 4 is a cross-sectional view of a touch sensor having a first protection layer, a second protection layer, and a third protection layer formed thereon according to still another preferred embodiment of the present invention. Referring to FIG. 4, the touch sensor 100 according to still another preferred embodiment of the present invention may include all of the first protection layer 31, the second protection layer 33, and the third protection layer 35 as shown in FIGS. 1, 2, and 3. In addition, the touch sensor 100 according to still another preferred embodiment of the present invention may form a first electrode pattern 11 on one surface of the base substrate 10 and may form a second electrode pattern 13 on the other surface of the base substrate 10. Thereby, the first protection layer 31 and the second protection layer 33 may be formed on one surface and the other surface, respectively, and the third protection layer 35 may be formed on the side surfaces. Therefore, water introduction into the electrode pattern 20 and corrosion thereof may be prevented, and foreign material which may be introduced from the outside may be pre-blocked. As a result, reliability of the electrode pattern 20 may be further improved.

In the touch sensor 100 according to still another preferred embodiment of the present invention as shown in FIG. 4, since the technical content and description related to the base substrate 10, the electrode pattern 20, the first protection layer, 31, the second protection layer 33, the third protection layer 35, the adhesive layer 50, the window substrate 60, and the display unit 70 are substantially the same as those described above in the touch sensor according to the preferred embodiment of the present invention as shown in FIGS. 1, 2, and 3, a description overlapped with each other will be omitted.

Figure 5:
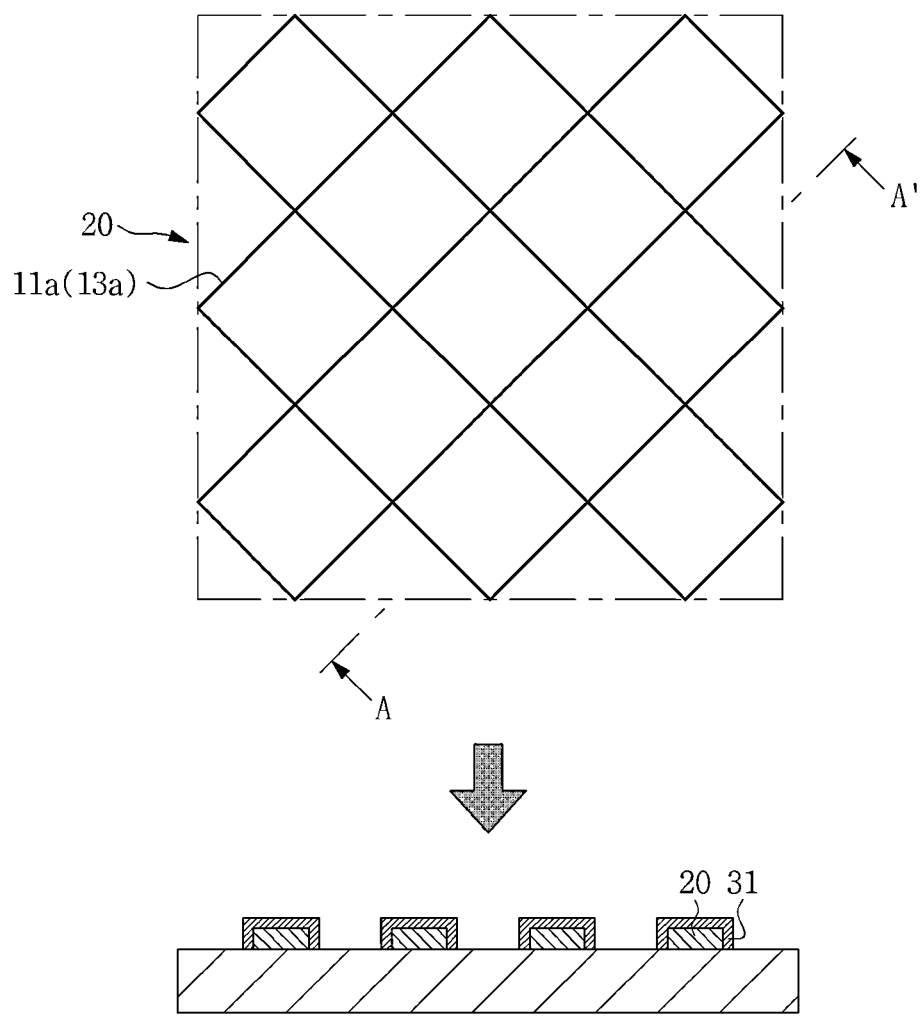
FIG. 5 is a cross-sectional view of metal fine lines forming an electrode pattern.

FIG. 5 is a cross-sectional view of a metal fine line forming an electrode pattern. Referring to FIG. 5, FIG. 5, which shows an electrode pattern 20 formed by intersecting metal fine lines 11a and 13a with each other, is a cross-sectional view showing the electrode pattern in a section A to A'. The touch sensor 100 according to the present invention may form the first protection layer 31 including the heterocycle compound on the metal fine lines 11a and 13a because the metal fine lines 11a and 13a forming the electrode pattern 20 are vulnerable to water and corrosion. Thereby, the touch sensor 100 according to the preferred embodiments of the present invention solves the problem that the metal is vulnerable to water and corrosion by forming the first protection layer 31 including the heterocycle compound on the metal in using the electrode pattern 20 formed of the metal to thereby prevent water introduction and corrosion even in the condition of high temperature and humidity, such that reliability implementation of the electrode pattern 20 may be maintained.

According to the preferred embodiment of the present invention, the touch sensor solves the problem that the metal is vulnerable to water and corrosion by forming the first protection layer including the heterocycle compound on the metal in using the metal electrode, such that reliability of the metal electrode may be implemented and economical efficiency may be advantageous.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A touch sensor, comprising:

a base substrate;

an electrode pattern formed on one surface of the base substrate and formed by intersecting metal fine lines with each other;

a first protection layer formed on the electrode pattern; and an adhesive layer formed on the electrode pattern having the first protection layer formed thereon;

wherein the first protection layer includes a heterocycle compound, and wherein a second protection layer is formed on side surfaces including the base substrate and the adhesive layer.

2. The touch sensor as set forth in claim 1, wherein the heterocycle compound is at least one selected from a group consisting of imidazole, azole, thiol, and amine based.

3. The touch sensor as set forth in claim 2, wherein the heterocycle compound is a benzimidazole derivative represented by the following Chemical Formula 1 or a benzotriazole derivative represented by the following Chemical Formula 2,

[Chemical Formula 1]

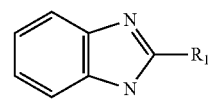

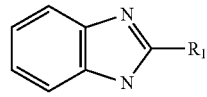

[Chemical Formula 1]

wherein $R_1$ is an alkyl group ($C_nH_{2n+1}$) (n is integer of 1 to 5) or an aryl group (Ar—), and

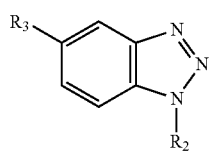

[Chemical Formula 2]

wherein $R_2$ is hydrogen (H) or an ester group (COOCH$_3$) and $R_3$ is a methyl group (CH$_3$) or carboxyl group (COOH).

8. The touch sensor as set forth in claim 5, wherein the third protection layer is at least one selected from a group consisting of acryl, epoxy, urethane, poly methyl methacrylate, polycarbonate, and poly vinyl acetate.

9. The touch sensor as set forth in claim 1, wherein the second protection layer is at least one selected from a group consisting of liquefied acryl, epoxy, and urethane based.

* * * * * wherein $R_1$ is an alkyl group ($C_nH_{2n+1}$) (n is integer of 1 to 5) or an aryl group (Ar—), and

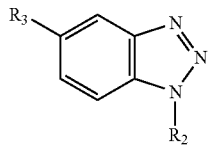

[Chemical Formula 2]

wherein $R_2$ is hydrogen (H) or an ester group (COOCH$_3$) and $R_3$ is a methyl group (CH$_3$) or carboxyl group (COOH).

4. The touch sensor as set forth in claim 1, wherein the electrode pattern includes a first electrode pattern formed on one surface of the base substrate and a second electrode pattern formed on the other surface of the base substrate.

5. The touch sensor as set forth in claim 1, wherein the electrode pattern having the first protection layer formed thereon has a third protection layer formed on an entire surface thereof.

6. The touch sensor as set forth in claim 5, wherein the first protection layer is at least one selected from a group consisting of imidazole, azole, thiol, and amine based.

7. The touch sensor as set forth in claim 6, wherein the heterocycle compound is a benzimidazole derivative represented by the following Chemical Formula 1 or a benzotriazole derivative represented by the following Chemical Formula 2,